June 7, 1960 G. ABRAHAM 2,939,966

ELECTRICAL SWITCHING CIRCUIT

Filed Dec. 20, 1956 2 Sheets-Sheet 1

INVENTOR
GEORGE ABRAHAM

BY W.R. Maltby
Richard C. Read
ATTORNEYS

June 7, 1960 G. ABRAHAM 2,939,966

ELECTRICAL SWITCHING CIRCUIT

Filed Dec. 20, 1956 2 Sheets-Sheet 2

INVENTOR
GEORGE ABRAHAM

BY W R Mattop
Richard C Reed
ATTORNEYS

United States Patent Office 2,939,966

Patented June 7, 1960

2,939,966

ELECTRICAL SWITCHING CIRCUIT

George Abraham, 3107 Westover Drive SE., Washington, D.C.

Filed Dec. 20, 1956, Ser. No. 629,763

2 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical signaling translating circuits and in particular to multistable circuits.

In the field of electronics, a multistable circuit may find many useful applications. By way of example, in a counter, a plurality of multistable circuits, connected in tandem, may be used when it is desired to count pulses occurring either at regular intervals or at random. At present, counters employ conventional bistable circuits that have a number of disadvantages. For example, to obtain only two stable states, these circuits usually require a complicated arrangement using two transistors or two electron tubes. Thus, if several bistable circuits are utilized in a single counter, the physical size and weight of the counter will be appreciable. If electron tubes are used, the power consumption will be high and a large portion of the power supplied to the counter, because of the low efficiency, will be dissipated as heat.

In accordance with the foregoing, it is an object of the present invention to provide a multistable circuit having more than one stable state.

Another object of the present invention is to provide a multistable circuit employing a minimum number of circuit elements and requiring a negligible amount of power.

Another object of the present invention is to provide a multistable electrical circuit in which a source of dynamic B+ is applied to a variable impedance device to cause the storage of a steady state of electrical charge carriers in the variable impedance device and thereby obtain a voltage controlled negative resistance curve on which two stable states may be located.

Other objects and many of the attendant advantages of this invention will be readily apparent as the same becomes better understood by reference to the foregoing detailed description when considered in connection with the accompanying drawings wherein:

Fig. 1 discloses a first embodiment of the present invention.

Fig. 2 discloses a second embodiment of the present invention.

Fig. 3 discloses a third embodiment of the present invention.

As used in the present application, "dynamic B+" is defined as a continually varying potential applied to a selected nonlinear device to store energy therein and to enable the device to function as an amplifier and/or to exhibit a negative resistance characteristic. As an example, a source of dynamic B+ may be a source of recurring signals providing signals having a frequency or repetition rate greater than the reciprocal of the lifetime of electrical charge carriers injected into the variable impedance device to which the source of dynamic B+ is connected.

In accordance with the present invention, a multistable circuit is provided wherein a source of dynamic B+ is connected in series with a single variable impedance device to inject electrical charge carriers into the variable impedance device at a rate greater than the electrical charge carriers decay due to recombination to maintain a steady state of stored electrical charge carriers in the variable impedance device. The stored electrical charge carriers are used to obtain a negative resistance curve having two regions in which stable states of operation may be located. The multistable circuit thus obtained may be triggered to a desired stable state in several ways such as by varying the relative amplitude, phase, or width of pulses applied to a selected element of the variable impedance device or by varying the bias, or by varying the impedance load on the variable impedance device, or by varying the frequency, amplitude or phase of the dynamic B+ applied to the variable impedance device. For example, triggering from a first stable state to a second stable state may be accomplished by applying a pulse or proper polarity and proper amplitude for a given load line to a desired element of the variable impedance device and a pulse of reverse polarity and the same amplitude will trigger the multistable circuit from the second to the first stable state.

Figures 1, 2, 3, 4A, 4B, 4C, 5:
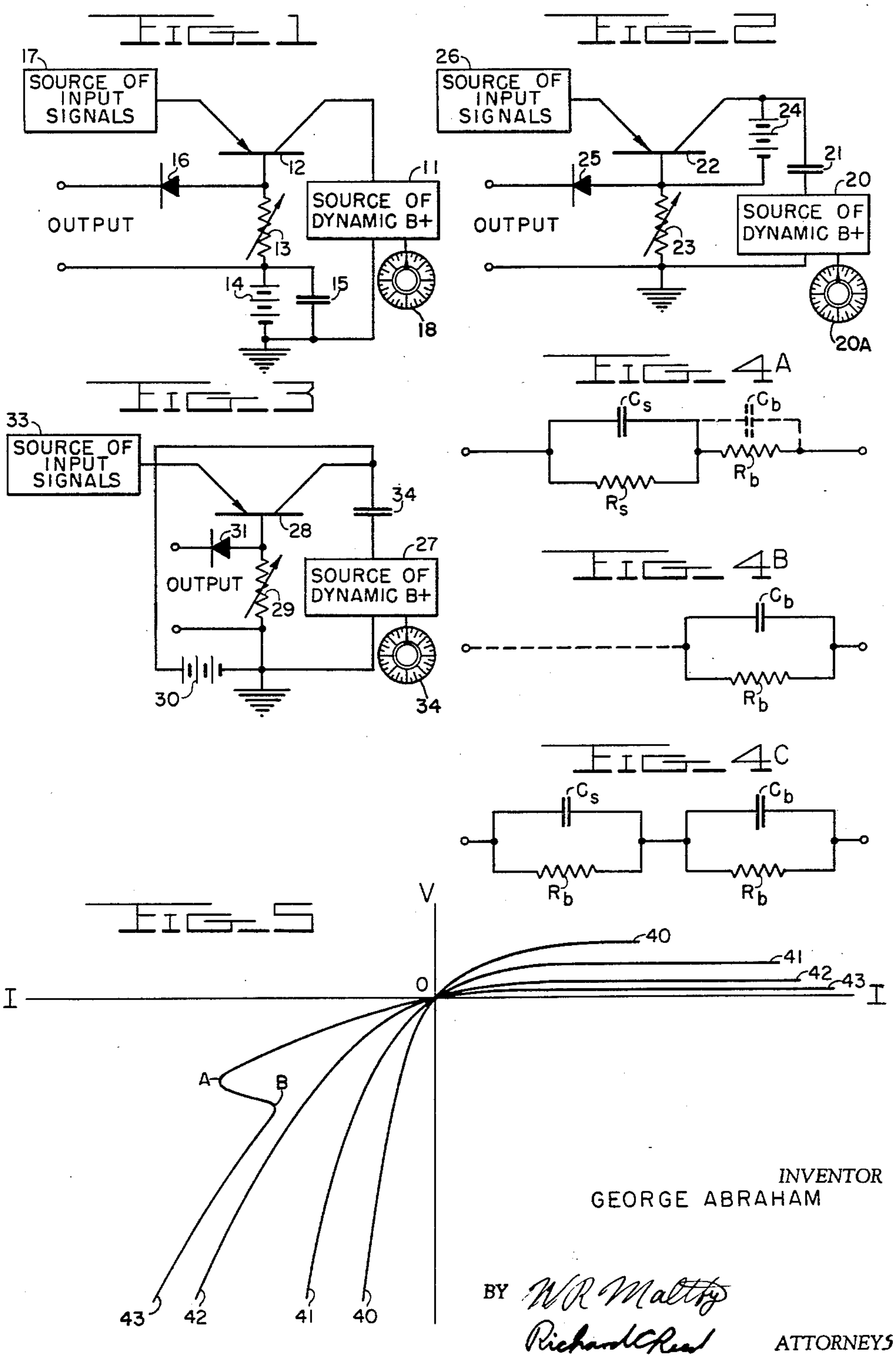
Fig. 4A represents the equivalent circuit of a transistor before dynamic B+ is applied.
Fig. 4B represents the equivalent circuit during the application of dynamic B+.
Fig. 4C represents the equivalent circuit immediately after the dynamic B+ has been removed from the transistor.
Fig. 5 represents a family of characteristics curves including a negative resistance curve of the variable impedance device shown in the circuit of Fig. 1.

Referring to Fig. 1, the first embodiment of the present invention comprises a multistable circuit in which a source of dynamic B+ 11 is connected in series with variable impedance device 12, variable resistor 13 and a source of direct current voltage 14. The source of direct current voltage 14 may be any conventional constant voltage source. A condenser 15 is connected in parallel with the source of direct current voltage. Control knob 18, which is connected to source of dynamic B+ 11, may be used to vary such parameters of the source of dynamic B+ as frequency, phase, duration, and magnitude. The output of the multistable circuit is connected across variable resistor 13 in series with unilateral directional device 16, and a source of input signals 17 is connected to first element of variable impedance device 12. It is, of course, understood that the source of input signals 17 could be connected to the second element of variable impedance device 12 instead of to the first.

Referring to Fig. 2, it is noted that the second embodiment of the present invention comprises a multistable circuit in which a source of dynamic B+ 20, having a control knob 20A, is connected in series with a capacitor 21, a variable impedance device 22 and a variable resistor 23. Control knob 20A may be used to vary such parameters of the source of dynamic B+ 20 as frequency, phase, duration, and magnitude. A source of direct current voltage 24 is connected across the elements of the variable impedance device 22. A source of input signals 26 is connected to one element of variable impedance device 22 and the output of the multistable circuit is connected across variable resistor 23 and in series with unilateral impedance device 25.

Now referring to Fig. 3, it is noted that the third embodiment of the present invention comprises a multistable circuit in which a source of dynamic B+ 27, having a control knob 34, is connected in series with a capacitor 34, a variable impedance device 28, and a variable resistor 29. Control knob 34 may be used to vary such parameters of the source of dynamic B+ 27 as frequency, phase, duration, and magnitude. A source of direct current voltage 30 is connected across the variable impedance device 28 and the variable resistor 29. A source of input signals is connected to one element of variable impedance device 28, and the output of the multistable circuit is connected across variable resistor 29 and in series with unilateral impedance device 31.

In the embodiments shown in Figs. 1, 2 and 3 the variable impedance devices 12, 22 and 28 may be any suitable elements wherein two or more electrical charge carriers having appropriate lifetimes are operative, for example, arc discharge devices or semiconductor devices such as diodes, transistor triodes, transistor tetrodes, or phototransistors, and the electrical charge carriers may be any positive or negative charges such as electrons, ions, or holes. A source of dynamic B+ may be any source of recurring signals so long as the frequency or repetition rate of the recurring signals is greater than the reciprocal of the lifetime of injected electrical charge carriers, and so long a first element of each variable impedance device is driven positive with respect to a second element of the variable impedance device during one portion and negative with respect to the second element during another portion of each cycle of operation.

In the embodiments shown in Figs. 1, 2 and 3, the circuit is operated from a constant voltage, square wave generator used as a source of dynamic B+, for example, at 1 mc. with a 50% duty cycle. The variable impedance devices used are point contact transistors of N-type material, and therefore, the injected electrical charge carriers are holes. For a given value of dynamic B+ the values of reverse bias and load impedance are selected to give a desired value of stored holes and a resulting negative resistance. It is understood that other types of dynamic B+ could be used in combination with a selected variable impedance device to maintain a steady state of electrical charge carriers. For example, a high frequency, sine wave oscillator could be used to inject and store holes in a tetrode transistor having an N-type base material.

In operation of the multistable circuit shown in Fig. 1, the source of dynamic B+ 11 is applied to variable impedance device 12; and after a few cycles of operation, the number of holes stored in the variable impedance device reach a steady state. Signals are then applied to one element of variable impedance device 12 from the source of input signals 17 to trigger the multistable circuit to a selected one of two stable states. Due to the fact that variable resistor 13 is connected in series with the source of dynamic B+ 11 and the source of direct current voltage 14, the voltage developed across the variable resistor in a given stable state will consist of a D.C. component and an A.C. component which has the same frequency as the source of dynamic B+. The unilateral directional device 16 rectifies the A.C. component of the voltage across variable resistor 13 to provide a component of the output voltage that is substantially pure direct current voltage and has a magnitude that is dependent upon the stable state to which the multistable circuit has been triggered. Since, as indicated above, the source of direct current voltage 14 is connected in series with variable impedance device 12 and the source of dynamic B+ 11, in this embodiment of the present invention, a component of direct current voltage will also appear across variable resistor 13 that is dependent on the magnitude of the source of direct current voltage 14.

The operation of the multistable circuit shown in Fig. 2 is substantially the same as the operation of the circuit shown in Fig. 1. However, since the source of direct current voltage 24 is not connected in series with variable resistor 23, the voltage developed across variable resistor 23 will not include a direct voltage component that is dependent on the source of direct current voltage.

Likewise, the operation of the multistable circuit shown in Fig. 3 is substantially the same as the operation of the multistable circuit shown in Fig. 1. In connection with this figure, however, it is noted that since the source of direct current voltage 30 is connected across variable impedance device 28 and variable resistor 29, the source of direct current voltage 30 may be any conventional source of constant current and the output voltage will not include a component that is dependent on the source of direct current voltage 30.

In order to understand the operation of the multistable circuits shown in Figs. 1, 2 and 3, it is necessary to appreciate the relationship between several factors that affect the number of holes stored in the steady state. When the variable impedance device used is a transistor, these factors may be listed as follows: the transistor impedance, the load impedance, the bias, and the parameters of the dynamic B+ such as frequency, magnitude, phase and duration.

As indicated immediately above, the number of holes that will be stored in an N-type base material of a point contact transistor will be determined in part by the internal impedance of the transistor i.e., by the barrier capacitance, barrier resistance, base capacitance and base resistance of the transistor. As will be explained presently, the transistor impedance is not static but varies with or is modulated by the magnitude of dynamic B+ applied to the transistor.

The transistor impedance is dependent in part on such factors as the lifetime of the electrical charge carriers and diffusion length in the base material of the transistor. These factors in turn are determined by the material used and the process of manufacturing the transistor. The internal impedance is also dependent in part on the conditions under which the transistor is operated in a particular circuit. This will become apparent during the analysis of Figs. 4A, 4B and 4C which, it will be recalled, represent the equivalent circuit of a transistor, before, during and immediately after the application of dynamic B+.

Referring to Fig. 4A, when no dynamic B+ is applied to a transistor, if the transistor is a point contact unit having N-type, 5 ohm/cm. base material, typical values of the impedance parameters may be as follows: barrier capacitance $C_s$, approximately 3 $\mu\mu$f., barrier resistance $R_s$, approximately 10,000 ohms, base capacitance $C_b$, less than 0.1 $\mu\mu$f., which normally may be neglected, and base resistance $R_b$, approximately 100 ohms. The value of each impedance will be determined in part by the material used and the process of manufacture of the point contact transistor.

In the preferred embodiment of the present invention, a large magnitude of square wave dynamic B+ is applied to the transistor. As the dynamic B+ increases to its positive maximum value, there is considerable diffusion of electrical charge carriers into the base, and the value of the base capacitance $C_b$ becomes relatively large, approximately 350 $\mu\mu$f. The base resistance $R_b$ becomes smaller, approximately 60 ohms and as shown in Fig. 4B, these values cannot be neglected. The barrier capacitance $C_s$, because of the increased storage of electrical charge carriers, becomes larger, approximately 200 $\mu\mu$f. but the barrier resistance $R_s$ approaches zero, shunting out the increased barrier capacitance $C_s$. The barrier capacitance $C_s$ and barrier resistance $R_s$ may, therefore, be neglected as shown in Fig. 4B.

As shown in Fig. 4C, when the dynamic B+ goes to zero, the barrier capacitance $C_s$ instantaneously returns from the larger value of 200 $\mu\mu$f. to the smaller value of 3 $\mu\mu$f. and the barrier resistance $R_s$ instantaneously returns from approximately zero to 100 ohms. The base resistance $R_b$, however, returns slowly from the smaller value of 60 ohms to the larger value of 100 ohms and the base capacitance $C_b$ returns slowly from the larger value of 350 $\mu\mu$f. to the smaller value of 0.2 $\mu\mu$f. Before the base capacitance $C_b$ can attain its smaller value another cycle of dynamic B+ is applied to the transistor to return the base capacitance $C_b$ to its larger value. If a series of square waves are applied by the source of dynamic B+ to the transistor at a frequency greater than the reciprocal of the lifetime of the injected electrical charge carriers, after a few cycles of operation, the base capacitance $C_b$ will attain an average value. The number of electrical charge carriers stored in the base capacitance $C_b$ will, likewise, attain an average value or steady state that will be dependent in part upon the magnitude, duration, and frequency of the dynamic B+ applied to the transistor.

Figure 7:
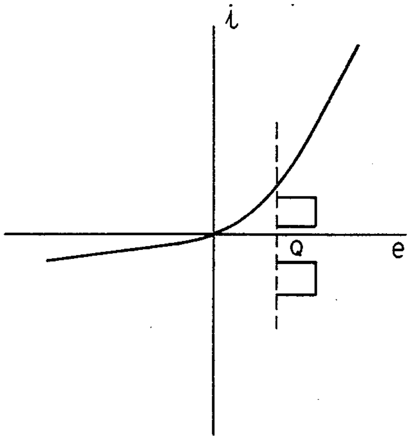
Fig. 7 represents a static barrier resistance characteristic curve of a transistor.
Figure 8:
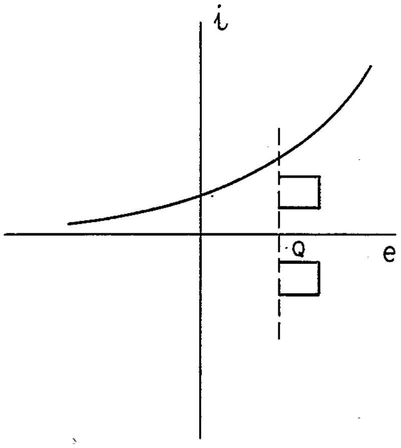
Fig. 8 represents a static barrier capacitance characteristic curve of a transistor.

Referring to Figs. 7 and 8, it is noted that the static barrier capacitance and static barrier resistance characteristic of a transistor are nonlinear and that the quiescent value of the barrier capacitance and resistance are dependent upon the bias applied to the transistor. The dynamic barrier capacitance and the dynamic resistance characteristic of the transistor will also be nonlinear and similar in shape to the curves for the respective static characteristic but the shape of the dynamic curves will also be dependent on the dynamic operating conditions such as the number of holes stored in the steady state, the load and bias applied to the transistor as well as the characteristic of the transistor itself. For example, the steepness of the dynamic barrier capacitance curve will be increased for a given bias as the number of holes stored in the steady state is increased. However, from the static characteristic curves shown in Figs. 7 and 8, it is seen that when dynamic B+ is applied to the transistor, the barrier capacitance and barrier resistance vary in dependency upon the magnitude of the dynamic B+. Similar relationships exist between the magnitude of the dynamic B+ and the dynamic barrier capacitance and resistance of the transistor and these relationships determine in part the magnitude of the steady state as explained in connection with Figs. 4A, 4B and 4C.

The number of electrical charge carriers stored in the steady state is dependent in part upon the value of the load impedance and consequently may be varied by changing the value of load impedance. Hence, in Figs. 1, 2 and 3 the magnitude of the steady state may be controlled by variable resistors 13, 23 and 29, respectively.

The number of electrical charge carriers stored in the steady state will affect the shape of the voltage-current characteristic curve of variable impedance devices 12, 22 and 28 in the multistable circuits shown in Figs. 1, 2 and 3, respectively.

Referring to Fig. 5, the voltage current characteristic curves shown in this figure may be obtained for either variable impedance device 12, 22, or 28 when employed in the multistable circuits shown in Figs. 1, 2 and 3, respectively. Accordingly, curve 40 represents the voltage current characteristic curve of either variable impedance device 12, 22 or 28 when the magnitude of dynamic B+ applied to the variable impedance device is zero. Curve 41 represents the voltage current characteristic when a relatively small magnitude of dynamic B+ is applied and curves 42 and 43 represent the voltage current characteristic when the relative magnitude of dynamic B+ is increased, the magnitude of dynamic B+ applied to obtain curve 43 being greater than the magnitude applied to obtain curve 42. It is noted that as the magnitude of dynamic B+ is increased, the conductivity of variable impedance device 12, 22 or 28 increases i.e., the current flow through the variable impedance device, per unit of voltage applied, increases. This, in effect, is equivalent to feedback which results in regeneration and is attributed to the storage of electrical charge carriers. Thus, in the circuit shown in Fig. 1, 2 or 3, as the magnitude of dynamic B+ is increased, the number of stored electrical charge carriers is increased and curve 40 assumes the position of curve 42. As the magnitude of the dynamic B+ applied to the circuits increases further and the proportion of the voltage across either variable impedance device 12, 22 or 28 increases, regeneration causes a part of curve 42 to assume the position of portion OA of curve 43. As the voltage across variable impedance device 12, 22 or 28 increases still further, regeneration is increased until with sufficient regeneration negative resistance appears at point A on the curve 43. Thereafter, increased voltage across variable impedance device 12, 22 or 28 will form the negative resistance portion AB of curve 43. The characteristic depicted in curve 43 is generally termed in the art as an "S" type, "voltage controlled," or "short circuit stable" negative resistance characteristic. For purposes of the present disclosure, the term "short circuit stable" is employed to define this type of negative resistance characteristic.

Figure 6:
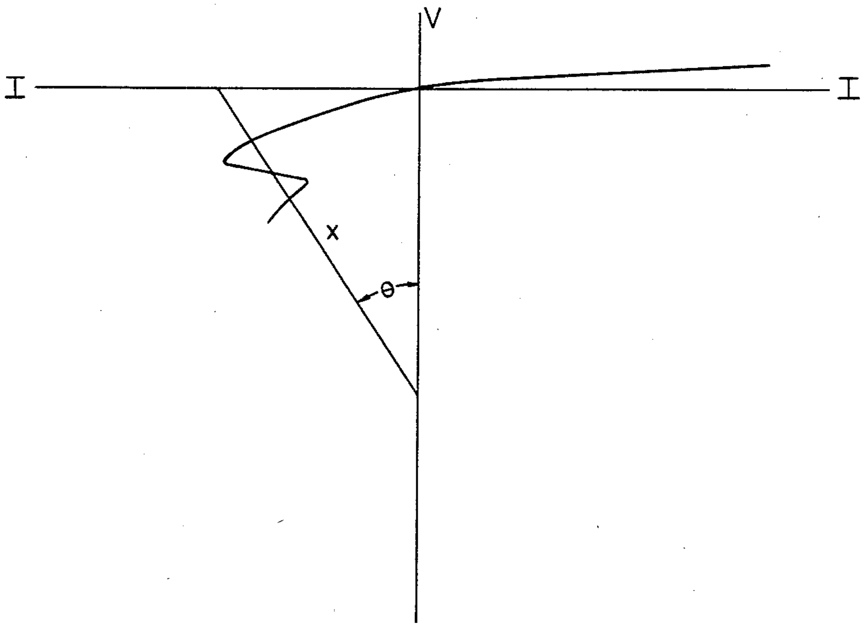
Fig. 6 represents the load line drawn on the negative resistance curve of the variable impedance device shown in the circuit of Figs. 1 to 3.

Referring to Fig. 6, it is noted that the load line X is drawn on a voltage current characteristic curve that may be representative of the multistable circuit shown in either Figs. 1, 2, or 3. Load line X is drawn through a point on the voltage ordinate in Fig. 6 that is determined by the bias applied to either variable impedance device 22, 12 or 28 in Figs. 1, 2, or 3, respectively, by the sources of direct current voltage 14, 24 or 30 at an angle $\theta$ whose cotangent is equal to the impedance of either variable resistor 13, 23 or 29 assuming that other impedances in the circuit are negligible. It is noted that the load line X intersects the voltage current characteristic curve in regions where the slope of the curve is negative as well as positive. The points of intersection in the positive regions represents stable states of operation for the multistable circuit shown in Figs. 1, 2 or 3. It is readily apparent, therefore, that the multistable circuits shown in Figs. 1, 2 or 3 may be triggered from one stable state to another by the magnitude and polarity of the voltage applied by the source of input signal 17, 26 or 33 to one element of variable impedance devices 12, 22 or 28, respectively, to increase the current through the variable impedance devices. The multistable circuits shown in Figs. 1, 2, or 3, may, likewise, be triggered by varying the slope of the load line X or by varying the phase, the duration of the signals applied to the variable impedance devices 12, 22, or 28, by varying the bias, or by varying the frequency, phase or duration of dynamic B+ applied to these variable impedance devices.

It should be understood, of course, that the foregoing disclosure relates to only a preferred embodiment of the present invention and that it is intended to cover all changes and modifications of the examples of the invention herein shown for the purposes of disclosure, which do not constitute departures from the spirit and scope of the invention as defined by the appended claims.

What is claimed is:

1. In an electrical circuit, a transistor having at least an emitter, collector and base, first and second terminals, means connecting said first terminal to said base, an impedance element connected between said first and second terminals, a source of bias connected between said collector and said first terminal, a source of input trigger signals connected to said emitter, an output circuit connected across said impedance element, and high frequency signal generating means connected between said collector and said second terminal for applying a series of pulses to the collector having a selected period such that the collector is forward biased with respect to the base during each period, whereby minority charge carriers are injected into said base, each pulse having a magnitude and said series of pulses having a repetition rate greater than the reciprocal of the lifetime of the minority charge carriers whereby a short circuit stable type of negative resistance characteristic is obtained.

2. In an electrical circuit, a transistor having at least an emitter, collector and base, first and second terminals, means connecting said first terminal and said base, an impedance element connected between said first and second terminals, a source of bias connected between said collector and said second terminal, a source of input trigger signals connected to said emitter, an output circuit connected across a said impedance element, and high frequency signal generating means connected between said collector and said second terminal for applying a series of pulses to the collector having a selected period such that the collector is forward biased with respect to the base during each period, whereby minority charge carriers are injected into said base, each pulse having a magnitude and said series of pulses having a repetition rate greater than the reciprocal of the lifetime of the minority charge carriers whereby a short circuit stable type of negative resistance characteristic is obtained.

References Cited in the file of this patent

UNITED STATES PATENTS

| | | |
|---|---|---|
| 2,533,001 | Eberhard | Dec. 5, 1950 |
| 2,595,208 | Bangert | Apr. 29, 1952 |
| 2,644,892 | Gehman | July 7, 1953 |
| 2,644,893 | Gehman | July 7, 1953 |
| 2,666,816 | Hunter | Jan. 19, 1954 |
| 2,708,720 | Anderson | May 17, 1955 |
| 2,843,765 | Aigrian | July 15, 1958 |

FOREIGN PATENTS

| | | |
|---|---|---|
| 160,213 | Australia | Dec. 10, 1954 |